United States Patent
Lee et al.

(10) Patent No.: US 9,980,141 B2
(45) Date of Patent: May 22, 2018

(54) USER AUTHENTICATION METHOD USING PHONE NUMBER AND ONE OF NFC APPARATUS AND BEACON

(71) Applicant: BENPLE INC., Seoul (KR)

(72) Inventors: Kyoung Jun Lee, Seoul (KR); Jung Ho Jun, Seoul (KR)

(73) Assignee: BENPLE INC., Seoul (KR)

( * ) Notice: Subject to any disclaimer, the term of this patent is extended or adjusted under 35 U.S.C. 154(b) by 0 days. days.

(21) Appl. No.: 15/501,470

(22) PCT Filed: Jun. 19, 2015

(86) PCT No.: PCT/KR2015/006229
§ 371 (c)(1),
(2) Date: Feb. 3, 2017

(87) PCT Pub. No.: WO2016/021823
PCT Pub. Date: Feb. 11, 2016

(65) Prior Publication Data
US 2017/0223537 A1    Aug. 3, 2017

(30) Foreign Application Priority Data
Aug. 7, 2014   (KR) .................. 10-2014-0101784

(51) Int. Cl.
*H04W 12/06* (2009.01)
*H04W 4/00* (2018.01)
(Continued)

(52) U.S. Cl.
CPC ......... *H04W 12/06* (2013.01); *H04L 63/0876* (2013.01); *H04L 63/101* (2013.01); *H04W 4/008* (2013.01); *H04W 12/08* (2013.01)

(58) Field of Classification Search
CPC ..... H04W 12/06; H04W 12/08; H04W 4/008; H04L 63/0876; H04L 63/101
See application file for complete search history.

(56) References Cited

U.S. PATENT DOCUMENTS

| 2008/0172449 A1* | 7/2008 | Bengtsson | ........ H04M 1/72561 709/203 |
| 2008/0313229 A1* | 12/2008 | Taswell | ................ G06Q 20/208 |

(Continued)

FOREIGN PATENT DOCUMENTS

| KR | 10-2009-0001248 | 1/2009 |
| KR | 10-1281953 | 8/2013 |

(Continued)

*Primary Examiner* — Nathan Mitchell
(74) *Attorney, Agent, or Firm* — F. Chau & Associates, LLC

(57) ABSTRACT

A method for authenticating a user using a mobile terminal according to an exemplary embodiment of the present inventive concepts, in a system including an operation server managing a database for storing a first telephone number of a user, a near field wireless communication device, and a mobile terminal, receiving, by an application program installed in the mobile terminal, a uniform resource locator (URL) of the operation server from the near field wireless communication device, accessing, by the application program, the operation server using the URL and transmitting a second telephone number of the mobile terminal to the operation server, and using, by the application program, a service provided by the operation server according to a result of comparison between the first telephone number and the second telephone number performed by the operation server.

13 Claims, 11 Drawing Sheets

(51) Int. Cl.
*H04L 29/06* (2006.01)
*H04W 12/08* (2009.01)

(56) References Cited

U.S. PATENT DOCUMENTS

| | | | | |
|---|---|---|---|---|
| 2013/0102248 A1* | 4/2013 | Jay | ............ | H04L 67/02 |
| | | | | 455/41.1 |
| 2013/0252585 A1* | 9/2013 | Moshir | ............ | G06F 21/35 |
| | | | | 455/411 |
| 2013/0260693 A1* | 10/2013 | Un | ............ | G01S 5/02 |
| | | | | 455/67.11 |
| 2014/0053250 A1* | 2/2014 | Wethington | ............ | H04L 63/10 |
| | | | | 726/5 |
| 2015/0072654 A1* | 3/2015 | Moshir | ............ | H04W 12/08 |
| | | | | 455/411 |
| 2015/0079942 A1* | 3/2015 | Kostka | ............ | G06Q 30/0633 |
| | | | | 455/411 |
| 2015/0201329 A1* | 7/2015 | Daigle | ............ | H04L 9/3228 |
| | | | | 705/67 |
| 2016/0277999 A1* | 9/2016 | Graves | ............ | H04W 40/244 |

FOREIGN PATENT DOCUMENTS

| | | |
|---|---|---|
| KR | 10-1296863 | 8/2013 |
| WO | 2009/048887 | 4/2009 |

* cited by examiner

USER AUTHENTICATION METHOD USING PHONE NUMBER AND ONE OF NFC APPARATUS AND BEACON

This application, a national stage application under 35 USC 371(c) of PCT Application No. PCT/KR2015006229, filed on Jun. 19, 2015, claims priority under 35 U.S.C. § 119 to Korean Patent Application No. 10-2014-0101784, filed on Aug. 7, 2014, in the Korean Intellectual Property Office, the disclosure of which is incorporated by reference herein its entirety.

TECHNICAL FIELD

Embodiments of the present inventive concepts relate to a method for authenticating a user using a phone number of a mobile terminal and one of an NFC apparatus and a beacon.

DISCUSSION OF RELATED ART

Near field communication (NFC) refers to a contactless communication technology using a frequency band of 13.56 MHz, as one of electronic tag (or radio tag) technologies. As smart phones evolve, smart phones with an NFC function are widely used.

In particular, when the smart phone with an NFC function is brought to access an NFC apparatus including a uniform resource locator (URL), the smart phone may access a website corresponding to the URL using an application installed in the smart phone. In general, when a user of a smart phone accesses a website linked to an NFC apparatus using the smart phone, authentication or checking does not perform on whether the user is a legitimate user who can access the website.

A beacon is a Bluetooth low energy (BLE) device which may access a mobile application program installed in the smart phone when a customer carrying a smart phone enters a store. For example, a beacon may be embodied in a small Bluetooth transceiver in a Universal Serial Bus (USB) memory shape. By inserting a beacon into a USB port or a power outlet of a personal computer (PC) in the store, installation of the beacon ends. A BLE-based beacon has a transmission distance ranging from 10 m to 50 m, which is wide compared to an NFC, and thus may integrate a location-based marketing platform and a payment service.

SUMMARY

A technical aspect of the present inventive concepts is to provide a method for authenticating a user using a telephone number of a mobile terminal and one of an NFC apparatus and a beacon.

An exemplary embodiment of the present inventive concepts is directed to a method for authenticating a user using a mobile terminal, including, in a system including an operation server for managing a database storing a first telephone number of a user, a near field wireless communication device, and a mobile terminal, receiving, by an application program installed in the mobile terminal, a uniform resource locator (URL) of the operation server from the near field wireless communication device, accessing, by the application program, the operation server using the URL and transmitting a second telephone number of the mobile terminal to the operation server, and using, by the application program, a service provided by the operation server according to a result of comparison between the first telephone number and the second telephone number performed by the operation server. The near field wireless communication device in the method may be an NFC device or a beacon.

In the method, the application program uses entirely the service when the first telephone number and the second telephone number match each other, and the application program uses only a part of the service when the first telephone number and the second telephone number do not match each other.

The method may further include, when the near field wireless communication device is a beacon, receiving, by the application program, a service use request transmitted from the operation server before using the service, and transmitting, by the application program, the user's responses to the service use request to the operation server to use the service.

The method may further include querying, by the operation server, the application program whether to store the first telephone number in the database, and requesting, by the application program, the operation server to store the first telephone number in response to the query.

The method may further include generating, by the application program, an ID and a password by accessing the operation server and changing the first telephone number after authenticating a user using the ID and the password.

Another exemplary embodiment of the present inventive concepts is directed to a method for authenticating a user using a mobile terminal, including, in a system including an operation server managing a database for storing a first telephone number of a user and a first ID of a near field wireless communication device registered in advance, a near field wireless communication device, and the mobile terminal, receiving, by an application installed in the mobile terminal, a second ID of the near field wireless communication device and a URL of the operation server from the near field wireless communication device, accessing, by the application program, the operation server using the URL and transmitting the second ID and a second telephone number of the mobile terminal to the operation server, and using, by the application program, a service provided by the operation server according to a result of comparison in telephone numbers including the first telephone number and the second telephone number and in IDs including the first ID and the second ID performed by the operation server.

In the method, the near field wireless communication device may be an NFC device or a beacon. In the method, the application program may use entirely the service when the first telephone number and the second telephone number match each other, and the first ID and the second ID match each other.

In the method, the operation server may match the first telephone number and the second telephone number, and the application program may use entirely the service when the first telephone number and the second telephone number match each other.

Still another exemplary embodiment of the present inventive concepts is directed to a method for authenticating a user using a mobile terminal, including, in a system including an operation server managing a database for storing a first telephone number of a user, a beacon, an ID search engine, and the mobile terminal, receiving, by an application program installed in the mobile terminal, a beacon ID from the beacon, transmitting, by the application program, the beacon ID to the ID search engine and receiving a uniform resource locator (URL) of an operation server corresponding to the beacon ID from the ID search engine, accessing, by the application program, the operation server using the URL and transmitting a second telephone number of the mobile terminal to the operation server, and using, by the application program, a service provided by the operation server according to a result of comparison between the first telephone number and the second telephone number performed by the operation server.

In the method, the application program may use entirely the service when the first telephone number and the second telephone number match each other, and the application program may use only a part of the service when the first telephone number and the second telephone number do not match each other.

Still another exemplary embodiment of the present inventive concepts is directed to a method for authenticating a user using a mobile terminal, including, in a system including an operation server managing a database for storing a first telephone number of a user and a first ID of a beacon registered in advance, a beacon, an ID search engine, and the mobile terminal, receiving, by an application program installed in the mobile terminal, a second ID of the beacon from the beacon, transmitting, by the application program, the second ID of the beacon to the ID search engine and receiving a URL of an operation server corresponding to the second ID from the ID search engine, accessing, by the application program, the operation server using the URL and transmitting the second ID and a second telephone number of the mobile terminal to the operation server, and using, by the application program, a service provided by the operation server according to a result of comparison in telephone numbers including the first telephone number and the second telephone number and in IDs including the first ID and the second ID performed by the operation server.

In the method, the application program may use entirely the service when the first telephone number and the second telephone number match each other, and the first ID and the second ID match each other.

In the method, the operation server may match the first telephone number and the first ID, and the application program may use entirely the service when the first telephone number and the second telephone number match each other.

The method for authenticating a user using a mobile terminal may be recorded in a computer program and stored in a computer-readable recording medium.

According to exemplary embodiments of the present inventive concepts, a method for authenticating a user using an application installed in a mobile terminal can easily authenticate or confirm whether a user is a suitable user capable of appropriately using a service originally scheduled to be provided by a NFC device or a beacon without going through an additional user authentication process.

DETAILED DESCRIPTIONS OF EXEMPLARY EMBODIMENTS

In the present specification, a beacon collectively refers to hardware that provides a mobile communication terminal with information in a broadcasting method using various communication technologies including Bluetooth, or software that performs the same function as the hardware.

Moreover, a beacon may refer to a device for data communication using a Bluetooth low energy (BLE). For example, a beacon may transmit data to a mobile terminal simply when the mobile terminal passes by a place in which the beacon is installed without a need to bring the mobile terminal (for example, mobile phone) close to an NFC module and tag the NFC module like an NFC device. The beacon may transmit data to the mobile terminal in a push manner.

For example, a beacon refers to hardware or a hardware module for communication using a wireless personal area network (WPAN) or Infrared Data Association (IrDA). For example, WPAN may include Bluetooth, Zigbee, or Ultra Wide Band (UWB).

An NFC apparatus or NFC device in the present specification includes an NFC tag, an NFC dongle, and the like and refers to hardware or a hardware module for NFC communication.

A mobile terminal in the present specification refers to a wireless communication terminal capable of transmitting or receiving data to or from an NFC device or a beacon. Accordingly, the mobile terminal may be a mobile telephone, a smart phone, a tablet PC, a mobile internet device (MID), an internet tablet, a digital camera, an Internet of Things (IoT) device, an Internet of Everything (IoE) device, or a wearable computer.

In the present specification, "transmitting or receiving signals (or data) using an application program installed in a mobile terminal means transmitting or receiving signals (or data) to or from a communication target (for example, an NFC device, a beacon, or an operation server) using a communication device (for example, transmitter or receiver) installed in the mobile terminal according to a control of the application program.

In the present specification, a uniform resource locator (URL) is a protocol for indicating where resources are located on a network, and the URL may represent all of the resources on the computer network as well as a website address. Accordingly, it is necessary to know a protocol for a corresponding URL and use the same protocol to access the web site address. In the present specification, exemplary embodiments of the present invention will be described in detail with reference to FIGS. 1 to 10.

Figure 1:
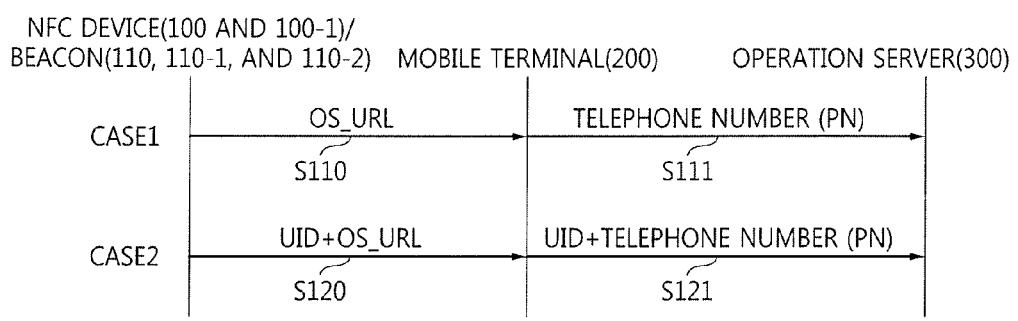
FIG. 1 shows a block diagram for schematically describing user authentication methods according to exemplary embodiments of the present inventive concepts.

FIG. 1 shows a data flow for schematically describing user authentication methods according to exemplary embodiments of the present inventive concepts. When a user tags (or scans) an NFC device (NFC apparatus) 100 or 100-1 using a mobile terminal 200, it is confirmed (or checked) whether the user is a suitable user for a service provided by the NFC device 100 and 100-1 through a telephone number PN of the mobile terminal 200 and a unique identification (UID) of the NFC device 100 or 100-1, and when the user is confirmed to be a suitable user, the user may be provided with the service without going through an additional user authentication process.

Moreover, when the mobile terminal 200 of user receives a beacon message BEM through a beacon 110, 110-1, or 110-2, it is confirmed whether the user is a suitable user of a service provided by the beacon 110, 110-1, or 110-2 through the telephone number PN of the mobile terminal 200 and a UID of the beacon 110, 110-1 or 110-2, and when the user is confirmed to be a suitable user, the user may be provided with the service without going through an additional user authentication process.

A case CASE1 shown in FIG. 1 shows a data flow for describing a method for authenticating a user using a telephone number PN of the mobile terminal 200 according to an exemplary embodiment of the present inventive concepts.

According to an exemplary embodiment, an applicant program installed in the mobile terminal 200 may receive a URL of an operation server 300 from the NFC device 100 or 100-1 or the beacon 110, 110-1 or 110-2 (S110). The application program may access the operation server 300 using the URL and transmit the telephone number PN of the mobile terminal 200 to the operation server 300 (S111). According to a confirmation result of the telephone number PN, when the user is a suitable user, the application program may be provided with a service from the operation server 300 without an additional user authentication process. The URL may be a URL for accessing an administrator providing an ID-based service, for example, the operation server 300, or may be a URL for accessing a website managed by the operation server 300.

A case CASE2 shown in FIG. 1 shows a data flow for describing a method for authenticating a user using a UID of a near field wireless communication device and a telephone number PN of the mobile terminal 200 according to another exemplary embodiment of the present inventive concepts. At this time, the near field wireless communication device refers to the NFC device 100 or 100-1 or the beacon 110, 110-1, or 110-2.

According to an exemplary embodiment, an application program installed in the mobile terminal 200 may receive an URL of the operation server 300 and a UID of a near field wireless communication device from the near field wireless communication device (S120). The application program may access the operation server 300 using the URL and transmit the telephone number PN of the mobile terminal 200 and the UID of the near field wireless communication device to the operation server 300 (S121). According to a confirmation result of the UID and the telephone number PN, when the user is a suitable user, the application program may be provided with a service from the operation server 300 without an additional user authentication process.

Figure 2:
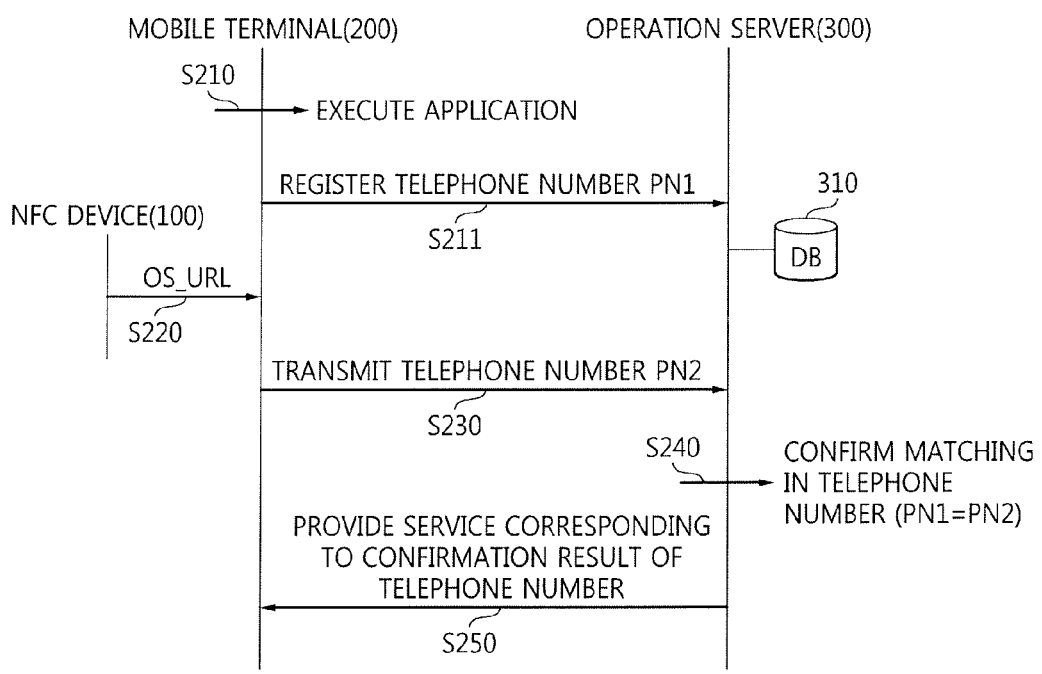
FIG. 2 shows a data flow for describing a user authentication method using a telephone number of a mobile terminal and an NFC device according to an exemplary embodiment of the present inventive concepts.

FIG. 2 shows a data flow for describing a user authentication method using a telephone number of a mobile terminal and an NFC device according to an exemplary embodiment of the present inventive concepts.

It is assumed that a telephone number PN1 of a user is registered in the operation server 300 in advance. The operation server 300 may compare a telephone number PN2 transmitted from the mobile terminal 200 with the telephone number PN1 of the user registered in advance, and provide the mobile terminal 200 with a service for the authenticated user when two telephone numbers PN1 and PN2 match each other according to a result of the comparison.

When two telephone numbers PN1 and PN2 do not match each other, the operation server 300 does not provide the mobile terminal 200 with the service for the authenticated user. However, even if the service for the authenticated user, which is originally scheduled to be provided by the NFC device 100, is not provided, that is, when the user is an unauthenticated user, the operation server 300 may provide a service corresponding to an unauthenticated user.

For example, when a user accesses a website providing a reservation service by touching a corresponding NFC tag to make a reservation for hospital diagnosis and treatment, and the telephone number PN2 transmitted from the mobile terminal 200 and the telephone number PN1 registered in a database 310 of the operation server 300 in advance match each other, the user can make a reservation for hospital diagnosis and treatment on the website without an additional authentication process. However, when the telephone number PN2 transmitted from the mobile terminal 200 and the telephone number PN1 registered in the database 310 of the operation server 300 in advance do not match each other, the user cannot make a reservation for hospital diagnosis and treatment and the operation server 300 can provide the user with a hospital advertisement service corresponding to the service for an unauthenticated user.

A user may execute an application program installed in the mobile terminal 200 (S210), and register a telephone number PN1 of the user in the operation server 300 (S211). That is, the operation server 300 may manage the database 310 for storing the telephone number PN1 of the user (S211).

When the user touches the NFC device 100 using the mobile terminal 200, the NFC device 100 may transmit an URL (OS_URL) of the operation server 300 to the application program installed in the mobile terminal 200 (S220). The application program may access the operation server 300 using the URL (OS_URL) of the operation server 300 and transmit a telephone number PN2 of the mobile terminal 200 to the operation server 300 (S230).

The operation server 300 confirms (or checks) whether the telephone number PN1 stored in the database and the telephone number PN2 of the mobile terminal match each other (S240), and the application program may use a service provided by the operation server 300 according to a result of the confirmation (S250). In an exemplary embodiment, the application program may use entirely or partly the service provided by the operation server 300 according to the result of the confirmation (S250).

According to an exemplary embodiment, when the telephone number PN1 stored in the database 310 and the telephone number PN2 of the mobile terminal 200 match (or coincide with) each other, the operation server 300 may provide a service originally scheduled to be provided by the NFC device 100, and the application program may use entirely the service provided by the operation server 300.

According to another exemplary embodiment, when the telephone number PN1 stored in the database 310 and the telephone number PN2 of the mobile terminal 200 do not match each other, the operation server 300 may not provide the service originally scheduled to be provided by the NFC device 100, and the application program may use only a part of the service provided by the operation server 300. That is, the operation server 300 may provide a differentiated service according to a confirmation result of telephone number.

Figure 3:
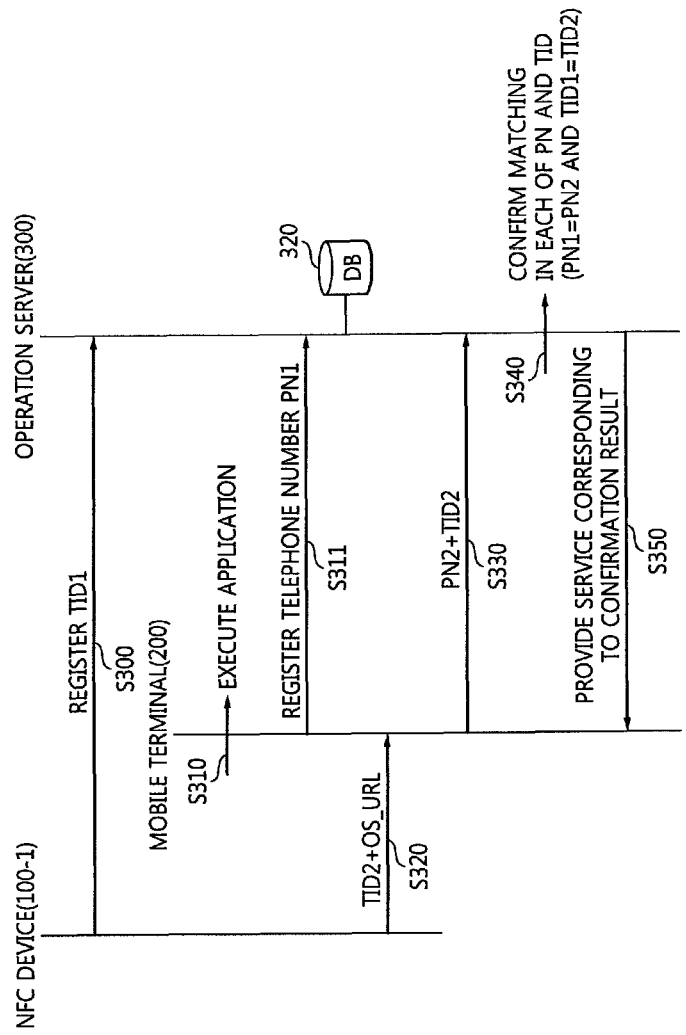
FIG. 3 shows a data flow for describing a user authentication method using a telephone number of a mobile terminal and an NFC device according to another exemplary embodiment of the present inventive concepts.

FIG. 3 shows a data flow for describing a user authentication method using a telephone number of a mobile terminal and an NFC device according to another exemplary embodiment of the present inventive concepts.

It is assumed that a UID (TID1) of an NFC device 100-1 and a telephone number PN1 of a user are registered in the operation server 300 in advance. That is, the operation server 300 may store and manage the UID (TID1) of the NFC device 100-1 and the telephone number PN1 of the user in a database 320.

The UID (TID1 or TID2) of the NFC device 100-1 refers to an ID for identifying a type of the NFC device 100-1, which indicates where the NFC device 100-1 is attached.

The operation server 300 may receive the UID (TID1) registered in the database 320 in advance and a UID (TID2) transmitted from the mobile terminal 200, and the telephone number PN1 registered in the database 320 in advance and a telephone number PN2 transmitted from the mobile terminal 200. When the UID (TID) registered in the database 320 in advance matches the UID (TID2) transmitted from the mobile terminal 200, and the telephone number PN1 registered in the database 320 in advance matches the telephone number PN2 transmitted from the mobile terminal 200, the operation server 300 may provide the mobile terminal 200 with a service for an authenticated user corresponding to the UID (TID1 or TID2).

However, when the UID (TID) registered in the database 320 in advance and the UID (TID2) transmitted from the mobile terminal 200 do not match each other, and the telephone number PN1 registered in the database 320 in advance and the telephone number PN2 transmitted from the mobile terminal 200 do not match each other, the operation server 300 does not provide the mobile terminal 200 with the service corresponding to the UID (TID1 or TID2). At this time, even if the operation server 300 does not provide the service originally scheduled to be provided by the NFC device 100-1, the operation server 300 may provide the user with a service corresponding to an unauthenticated user.

The UID (TID1) of the NFC device 100-1 may be registered in the operation server 300 in advance, and the operation server 300 may manage the database 320 for storing the UID (TID1) of the NFC device 100-1 (S300).

A user may execute an application program installed in the mobile terminal 200 (S310), and register a telephone number PN1 of the user in the operation server 300 (S311). That is, the operation server 300 may manage the database 320 for storing the telephone number PN1 of the user (S311). When the user touches the NFC device 100-1 using the mobile terminal 200, the NFC device 100-1 may transmit a URL (OS_URL) of the operation server 300 and a UID (TID2) of the NFC device 100-1 to the application program (S320).

The application program may access the operation server 300 using the URL (OS_URL) of the operation server 300, and transmit the UID (TID2) of the NFC device 100-1 and a telephone number PN2 of the mobile terminal 200 to the operation server 300 (S330).

The operation server 300 may confirm (or check) whether the telephone number PN1 stored in the database 320 and the telephone number PN2 of the user match each other, and whether the UID (TID1) stored in the database 320 and the UID (TID2) of the NFC device 100-1 match each other (S340), and the application program may use a service provided by the operation server 300 according to a result of the confirmation (S350). For example, the application program may use entirely or partly the service provided by the operation server 300 according to the result of the confirmation (S350).

For example, when two UIDs (TID1 and TID2) match each other and two telephone numbers PN1 and PN2 match each other, the operation server 300 may provide a service originally scheduled to be provided by the NFC device 100-1, and the application program may use entirely the service provided by the operation server 300. However, in the other cases, the operation server 300 may not provide the service originally scheduled to be provided by the NFC device 100-1, and the application program may use only a part of the service provided by the operation server 300. That is, the operation server 300 may provide a differentiated service according to whether the UIDs (TID1 and TID2) match each other and whether the telephone numbers PN1 and PN2 match each other.

Figure 4:
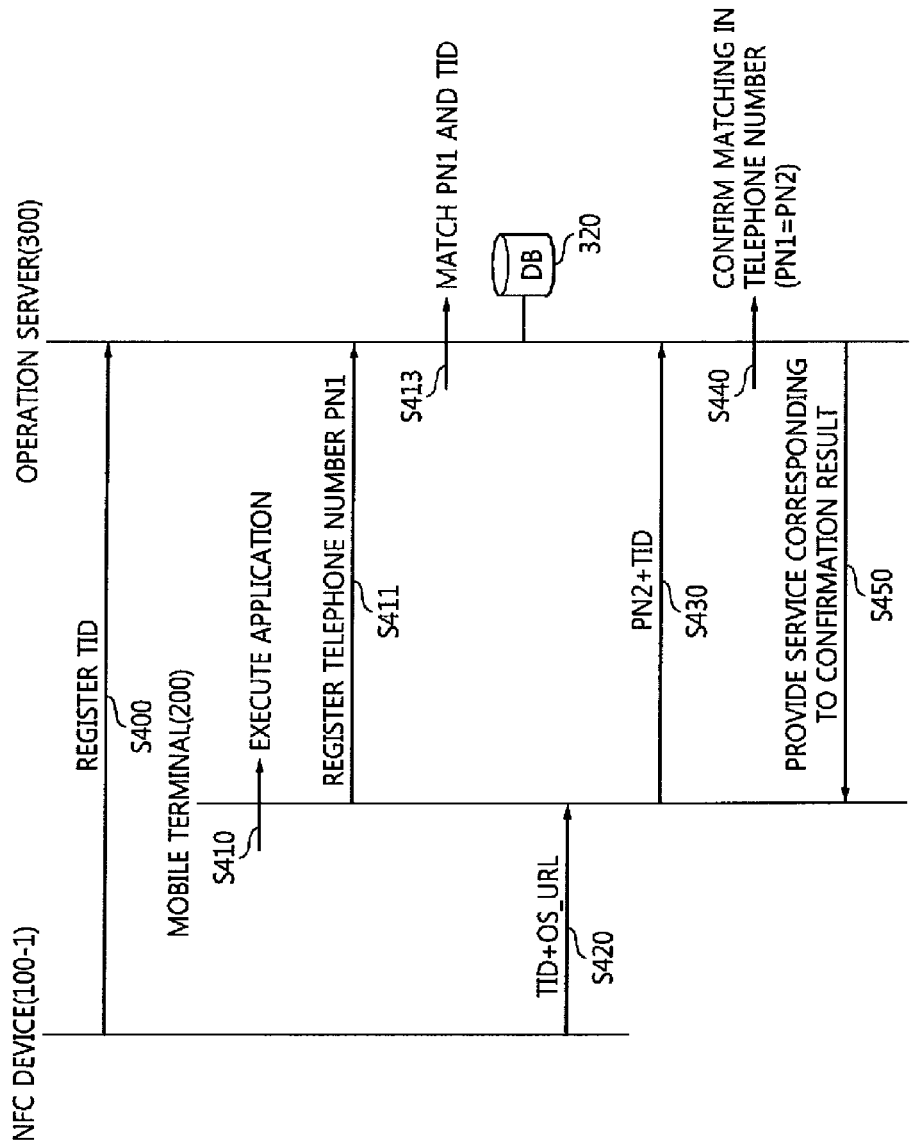
FIG. 4 shows a data flow for describing a user authentication method using a telephone number of a mobile terminal and an NFC device according to still another exemplary embodiment of the present inventive concepts.

FIG. 4 shows a data flow for describing a user authentication method using a telephone number of a mobile terminal and an NFC device according to still another exemplary embodiment of the present inventive concepts. A UID (TID) of the NFC device 100-1 and a telephone number PN1 or PN2 of a user need to match each other. That is, the NFC device 100-1 may be embodied in a user-customized (or dedicated) NFC device.

The operation server 300 performs a matching check between the UID (TID) of the NFC device 100-1 and the telephone number PN1 or PN2 of a user, and then, when the user is a suitable user according to a result of the matching check, that is, when the telephone number PN1 matched with the UID (TID) of the NFC device 100-1 and stored in the database 320 in advance and a telephone number PN2 transmitted from the mobile terminal 200 match each other, the operation server 300 may provide a service for an authenticated user, which is originally scheduled to be provided by the NFC device 100-1.

However, when the user is not a suitable user, that is, when the telephone number PN1 which matches the UID (TID) of the NFC device 100-1 and is stored in the database 320 in advance and the telephone number PN2 transmitted from the mobile terminal 200 do not match each other, the operation server 300 may not provide the service originally scheduled to be provided by the NFC device 100-1. At this time, even if the operation server 300 does not provide the service originally scheduled to be provided by the NFC device 100-1, the operation server 300 may provide the user with a service corresponding to an unauthenticated user.

For example, when the NFC device 100-1 is a wrist tag storing information on a patient with chronic disease and the patient touches the wrist tag using a mobile phone in an emergency, a telephone number PN2 transmitted from the mobile phone of the patient matches a telephone number PN1 of the patient registered in advance, and thus the operation server 300 may transmit information necessary for coping with the emergency to a mobile terminal of the patient.

For example, when the NFC device 100-1 is a wrist tag storing information of a patient with chronic disease and a doctor touches the wrist tag using a mobile phone of the doctor in an emergency, even if a telephone number PN2 transmitted from the mobile phone of the doctor does not match the telephone number PN1 registered in advance, if the doctor's license number and the like are transmitted to the operation server 300 through the mobile phone of the doctor, the operation server 300 may transmit information necessary for coping with the emergency to a mobile terminal of the doctor.

The UID (TID) of the NFC device 100-1 may be registered in the operation server 300 in advance, and the operation server 300 may manage the database 320 for storing the UID (TID) of the NFC device 100-1 (S400). A user may execute an application program installed in the mobile terminal 200 (S410), and register a telephone number PN1 of the user in the operation server 300 (S411). That is, the operation server 300 may manage the database 320 for storing the telephone number PN1 of the user (S411).

The operation server 300 may match the UID (TID) of the NFC device 100-1 and the telephone number PN1 of a user stored in the database 320 (S413). That is, a UID of a specific NFC device and a telephone number of a suitable user of a corresponding NFC device may be matched through the operation server 300. When the user touches the NF device 100-1 using the mobile terminal 200, the NFC device 100-1 may transmit the URL (OS_URL) of the operation server 300 and the UID (TID) of the NFC device 100-1 to the application program (S420).

The application program may access the operation server 300 using the URL (OS_URL) of the operation server 300, and transmit the UID (TID) of the NFC device 100-1 and a telephone number PN2 of the mobile terminal 200 to the operation server 300 (S430).

The operation server 300 may confirm or check whether the telephone number PN1 stored in the database 320 matches the telephone number PN2 of the mobile terminal 200 (S440), and the application program use a service provided by the operation server 300 according to a result of the confirmation (S450). In an exemplary embodiment, the application program may use entirely or partly the service provided by the operation server 300 according to the result of the confirmation (S450).

According to an exemplary embodiment, when the telephone number PN1 stored in the database 320 and the telephone number PN2 of the mobile terminal 200 match each other, the operation server 300 may provide the service originally scheduled to be provided by the NFC device 100-1 and the application program may use entirely the service provided by the operation server 300.

According to another exemplary embodiment, when the telephone number PN1 stored in the database 320 and the telephone number PN2 of the mobile terminal 200 do not match each other, the operation server 300 may not provide the service originally scheduled to be provided by the NFC device 100-1 and the application program may use only a part of the service provided by the operation server 300. That is, the operation server 300 may provide a differentiated service according to a confirmation result of a telephone number.

Figure 5:
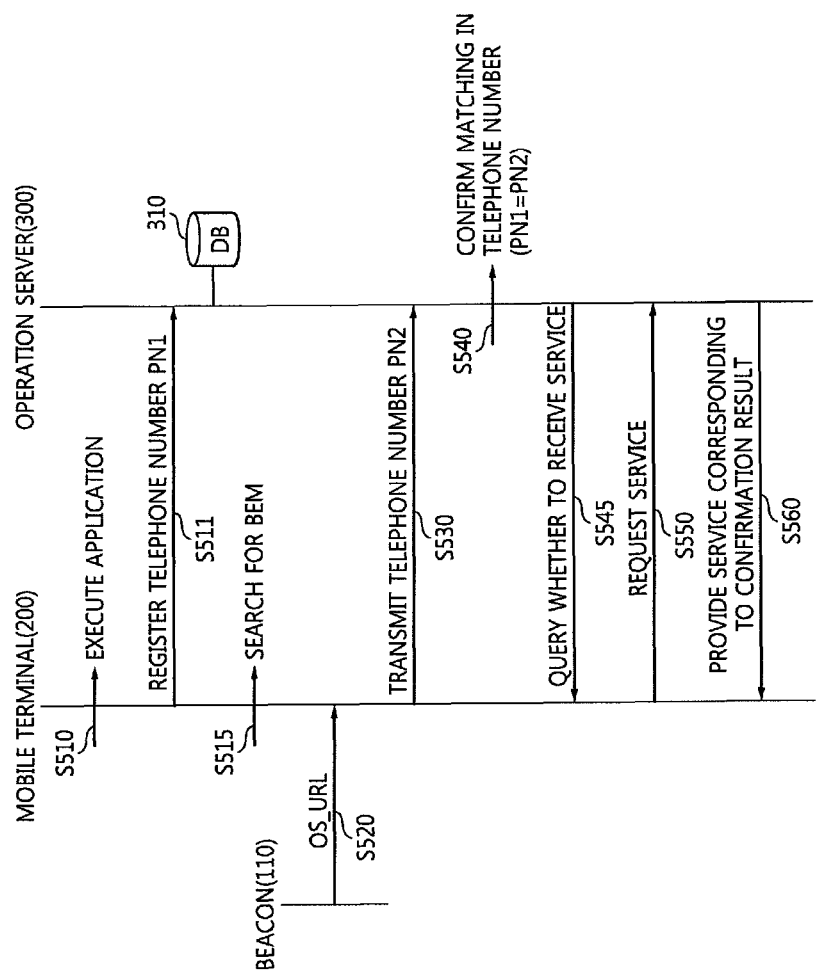
FIG. 5 shows a data flow for describing a user authentication method using a telephone number of a mobile terminal and a beacon according to an exemplary embodiment of the present inventive concepts.

FIG. 5 shows a data flow for describing a user authentication method using a telephone number of a mobile terminal and a beacon according to an exemplary embodiment of the present inventive concepts. Except that an NFC device is changed to a beacon, a method shown in FIG. 5 is substantially the same as or similar to the method shown in FIG. 2.

A user may execute an application program installed in the mobile terminal 200 (S510), and register or store a telephone number PN1 of the user in the operation server 300 (S511). That is, the operation server 300 may manage a database 310 for storing the telephone number PN1 of the user (S511).

The application program may search for a beacon message BEM output from one or more beacons (S515). The step S515 may or may not be performed according to a setting of the application program or a setting of a user of the mobile terminal 200. When the step S515 is performed by the settings, one of the searched beacon messages may be selected by a user or automatically. For example, the application program may automatically select a beacon message BEM with a relatively high strength.

The application program may receive a beacon message BEM from a beacon 110 (S520). The beacon message BEM may include the URL (OS_URL) of the operation server 300 (S520). The application program may access the operation server 300 using the URL (OS_URL) of the operation server 300 and transmit a telephone number PN2 of the mobile terminal 200 to the operation server 300 (S530).

The operation server 300 may confirm or check whether the telephone number PN1 stored in the database 310 and the telephone number PN2 of the mobile terminal 200 match each other (S540), and the application program may use a service provided by the operation server 300 according to a result of the confirmation. In an exemplary embodiment, the application program may use entirely or partly the service provided by the operation server 300 according to the result of the confirmation.

The NFC devices 100 and 100-1 are performed with a clear user intention such as tagging, scanning, or touching, and thus there is no query to the user whether to receive a service; however, the beacons 110, 110-1, and 110-2 are push-typed, a step of querying the user whether to receive the service is included.

According to exemplary embodiments, a service reception query may be performed before or after a user authentication. Whether to receive a service is queried after the user authentication in drawings to be described hereinafter, but it may be queried before the user authentication according to an exemplary embodiment.

The application program may receive the service use request transmitted from the operation server 300 (S545), and transmit the user's response to the service use request to the operation server 300 to use the service (S550). The operation server 300 may provide the mobile terminal 200 with a service corresponding to a result of the confirmation when the service use request is received from the application program (S560).

Figure 6:
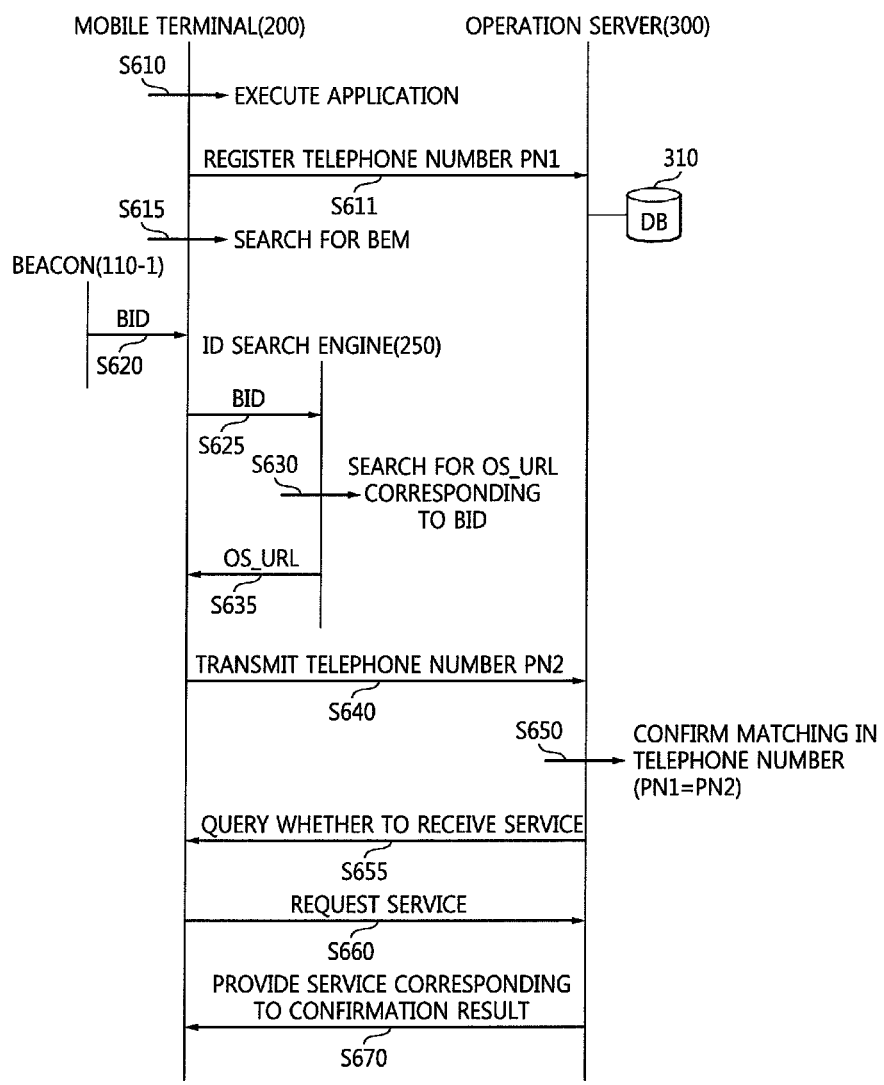
FIG. 6 shows a data flow for describing a user authentication method using a telephone number of a mobile terminal and a beacon according to another exemplary embodiment of the present inventive concepts.

FIG. 6 shows a data flow for describing a user authentication method using a telephone number of a mobile terminal and a beacon according to another exemplary embodiment of the present inventive concepts. Except that an application installed in the mobile terminal 200 receives a URL (OS_URL) of the operation server 300 corresponding to a UID (BID) of a beacon 110-1 through an ID search engine 250, a method shown in FIG. 6 is substantially the same as or similar to the method shown in FIG. 5.

The UID (BID) of the beacon 110-1 refers to an ID for identifying a type of the beacon 110-1, which indicates where the beacon 110-1 is attached.

A user may execute an application program installed in the mobile terminal 200 (S610), and register a telephone number PN1 of a user in the operation server 300 (S611). That is, the operation server 300 may manage the database 310 for storing the telephone number PN1 of a user (S611).

The application program may search for a beacon message BEM output from one or more beacons (S615). The step S615 may or may not be performed according to a setting of the application program or a setting of a user of the mobile terminal 200. When the step S615 is performed according to the settings, one of the searched beacon messages may be selected by the user or automatically. For example, the application program may automatically select a beacon message BEM with a relatively high strength.

The application program may receive the beacon message BEM from the beacon 110-1 (S620). The beacon message BEM may include the URL (OS_URL) of the operation server 300 (S620).

The application program may transmit the UID (BID) of the beacon 110-1 to the ID search engine 250 (S625). The ID search engine 250 searches for the URL (OS_URL) of the operation server 300 corresponding to the UID (BID) of the beacon 110-1 (S630), and transmit the searched URL (OS_URL) of the operation server 300 to the application program (S635).

The application program may access the operation server 300 using the URL (OS_URL) of the operation server 300 and transmit a telephone number PN2 of the mobile terminal 200 to the operation server 300 (S640).

The operation server 300 may confirm (or check) whether the telephone number PN1 stored in the database 310 and the telephone number PN2 of the mobile terminal 200 match each other (S650), and the application program may use a service provided by the operation server 300 according to a result of the confirmation. In an exemplary embodiment, the application program may use entirely or partly the service provided by the operation server 300 according to the result of the confirmation.

The application program may receive a service use request transmitted from the operation server 300 (S655), and transmit the user's response to the service use request to the operation server 300 to use entirely or partly the service (S660). The operation server 300 may provide the mobile terminal with a service corresponding to a result of the confirmation when the service use request is received from the application program (S670).

Figure 7:
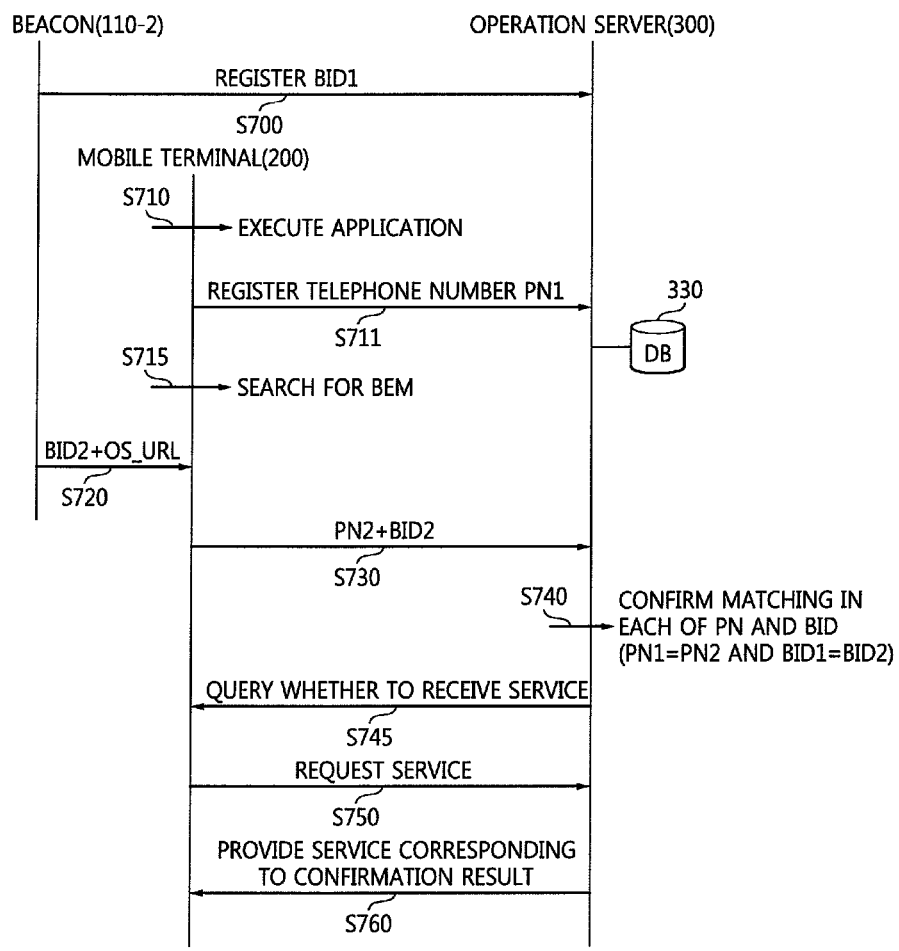
FIG. 7 shows a data flow for describing a user authentication method using a telephone number of a mobile terminal and a beacon according to still another exemplary embodiment of the present inventive concepts.

FIG. 7 shows a data flow for describing a user authentication method using a telephone number of a mobile terminal and a beacon according to still another exemplary embodiment of the present inventive concepts. Except that an NFC device is changed to a beacon, a method shown in FIG. 7 is substantially the same as or similar to the method shown in FIG. 3. A UID (BID1) of a beacon 110-2 may be registered in the operation server 300 in advance, and the operation server 300 may manage a database 330 for storing the UID (BID1) of the beacon 110-2 (S700).

A user may execute an application program installed in the mobile terminal 200 (S710), and register a telephone number PN1 of the user in the operation server 300 (S711). That is, the operation server 300 may manage the database 310 for storing the telephone number PN1 of the user (S711).

The application program may search for a beacon message BEM output from one or more beacons (S715). The step S715 may or may not be performed according to a setting of the application program or a setting of a user of the mobile terminal 200. When the step S715 is performed by the settings, one of the searched beacon messages may be selected by a user or automatically. For example, the application program may automatically select a beacon message BEM with a relatively high strength.

The application program may receive the beacon message BEM from the beacon 110-2 (S720). The beacon message BEM may include the URL (OS_URL) of the operation server 300 and the UID (BID2) of the beacon 110-2 (S720). The application program may access the operation server 300 using the URL (OS_URL) of the operation server 300 and transmit a telephone number PN2 of the mobile terminal 200 and the UID (BID2) of the beacon 110-2 to the operation server 300 (S730).

The operation server 300 confirms whether the telephone number PN1 stored in the database 330 and the telephone number PN2 of the user match each other, and whether the BID (BID1) stored in the database 330 and a BID (BID2) of the beacon 110-2 match each other (S740), and the application program may use a service provided by the operation server 300 according to a result of the confirmation. In an exemplary embodiment, the application program may use the service provided by the operation server 300 according to the result of the confirmation.

For example, when two UIDs BID1 and BID2 match each other and two telephone numbers PN1 and PN2 match each other, the operation server 300 may provide a service originally scheduled to be provided by the beacon 110-2, and the application program may use entirely service provided by the operation server 300. However, in the other cases, the operation server 300 may not provide the service originally scheduled to be provided by the beacon 110-2, and the application program may use only a part of the service provided by the operation server 300.

The application program may receive a service use request transmitted from the operation server 300 (S745), and transmit the user's response to the service use request to the operation server 300 to use the service (S750). The operation server 300 may provide the mobile terminal 200 with a service corresponding to a result of the confirmation when the service use request is received from the application program (S760). Accordingly, the user may use the service using the mobile terminal 200.

According to an exemplary embodiment, at the step S740, the operation server 300 may confirm whether the telephone number PN1 stored in the database 330 and the telephone number PN2 of the user match each other. At this time, it may be confirmed before the step S760 whether the BID (BID1) stored in the database 330 and the UID (BID2) of the beacon 110-2 match each other.

Figure 8:
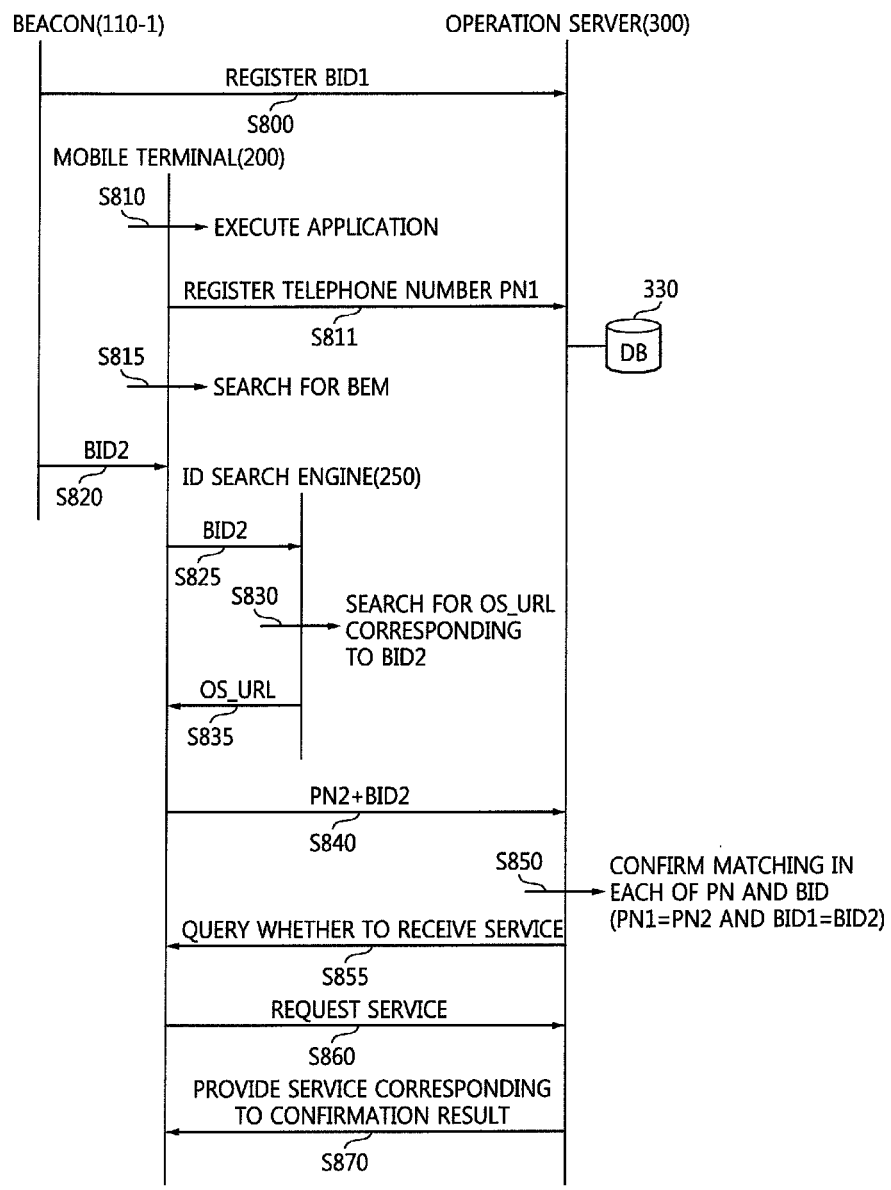
FIG. 8 shows a data flow for describing a user authentication method using a telephone number of a mobile terminal and a beacon according to still another exemplary embodiment of the present inventive concepts.

FIG. 8 shows a data flow for describing a user authentication method using a telephone number of a mobile terminal and a beacon according to still another exemplary embodiment of the present inventive concepts.

Except that an application program installed in the mobile terminal 200 receives a URL (OS_URL) of the operation server 300 corresponding to a UID (BID2) of the beacon 110-1 through the ID search engine 250, a method shown in FIG. 8 may be substantially the same as or similar to the method shown in FIG. 7.

AUDI (BID1) of the beacon 110-1 may be registered in the operation server 300 in advance, and the operation server 300 may manage the database 330 for storing the UID (BID1) of the beacon 110-1 (S800). A user may execute an application program installed in the mobile terminal 200

(S810), and register a telephone number PN1 of the user in the operation server 300 (S811). That is, the operation server 300 may manage the database 330 for storing the telephone number PN1 of the user (S811).

The application program may search for a beacon message BEM output from one or more beacons (S815). The step S815 may or may not be performed according to a setting of the application program or a setting of a user of the mobile terminal 200. When the step S815 is performed according to the settings, one of the searched beacon messages may be selected by the user or automatically. For example, the application program may automatically select a beacon message BEM with a relatively high strength.

The application program may receive the beacon message BEM from the beacon 110-1 (S820). The beacon message BEM may include a UID (BID2) of the beacon 110-1 (S820).

The application program may transmit the UID (BID2) of the beacon 110-1 to the ID search engine 250 (S825). The ID search engine 250 searches for the URL (OS_URL) of the operation server 300 corresponding to the UID (BID2) of the beacon 110-1 (S830), and transmit the searched URL (OS_URL) of the operation server 300 to the application program (S835).

The application program may access the operation server 300 using the URL (OS_URL) of the operation server 300 and transmit a telephone number PN2 of the mobile terminal 200 and the UID (BID2) of the beacon 110-1 to the operation server 300 (S840).

The operation server 300 may confirm (or check) whether the telephone number PN1 stored in the database 330 and the telephone number PN2 of the user match each other, and whether the BID (BID1) stored in the database 330 and the UID (BID2) of the beacon 110-1 match each other (S850), and the application program may use a service provided by the operation server 300 according to a result of the confirmation. In an exemplary embodiment, the application program may use entirely or partly the service provided by the operation server 300 according to the result of the confirmation.

For example, when two UIDs BID1 and BID2 match each other and two telephone numbers PN1 and PN2 match each other, the operation server 300 may provide a service originally scheduled to be provided by the beacon 110-1, and the application program may use entirely the service provided by the operation server 300. However, in the other cases, the operation server 300 may not provide the service originally scheduled to be provided by the beacon 110-1, and the application program may use only a part of the service provided by the operation server 300.

The application program may receive a service use request transmitted from the operation server 300 (S855), and transmit the user's response to the service use request to the operation server 300 to use entirely or partly the service (S860). The operation server 300 may provide the mobile terminal 200 with a service corresponding to a result of the confirmation when the service use request is received from the application program (S870). Accordingly, the user may use the service using the mobile terminal 200.

According to an exemplary embodiment, at the step S850, the operation server 300 may confirm only whether the telephone number PN1 stored in the database 330 and the telephone number PN2 of the user match each other. At this time, it may be confirmed before the step S870 whether the BID (BID1) stored in the database 330 and the UID (BID2) of the beacon 110-1 match each other.

Figure 9:
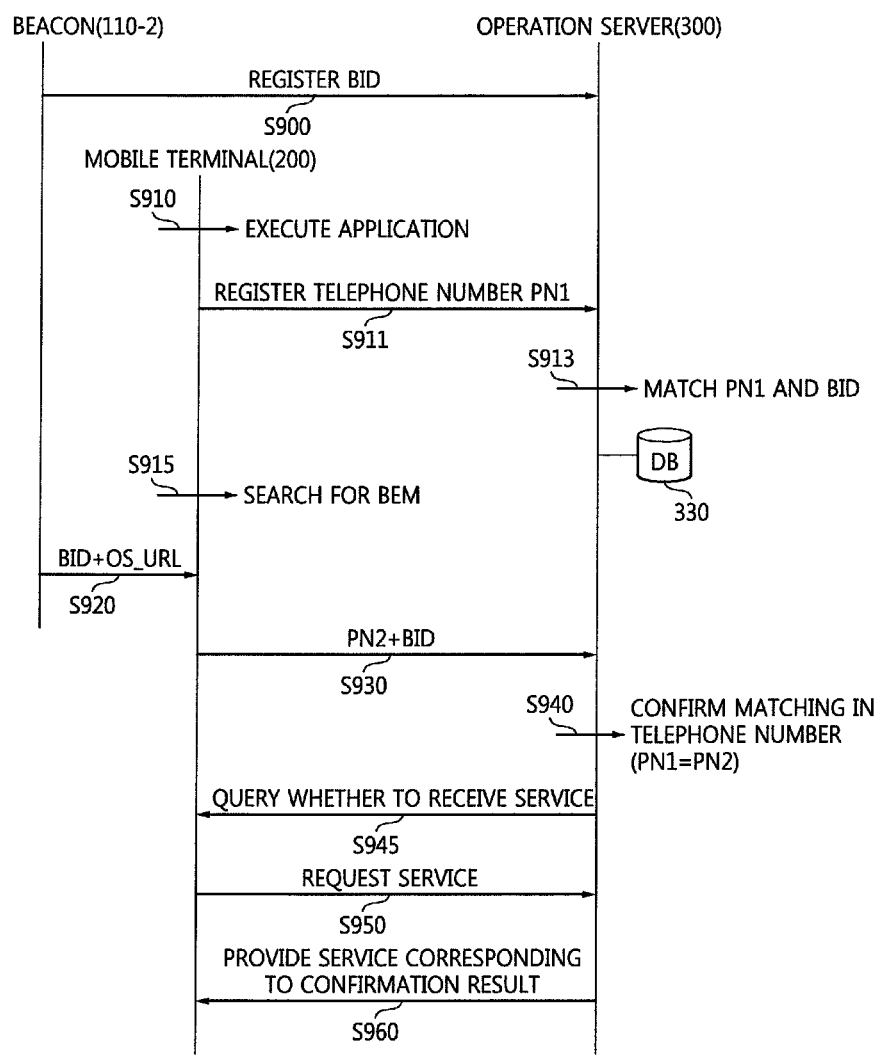
FIG. 9 shows a data flow for describing a user authentication method using a telephone number of a mobile terminal and a beacon according to still another exemplary embodiment of the present inventive concepts.

FIG. 9 shows a data flow for describing a user authentication method using a telephone number of a mobile terminal and a beacon according to still another exemplary embodiment of the present inventive concepts. Except that an NFC device is changed to a beacon, a method shown in FIG. 9 is substantially the same as or similar to the method shown in FIG. 4.

A UID (BID) of the beacon 110-2 may be registered in the operation server 300 in advance, and the operation server 300 may manage the database 330 for storing the UID (BID) of the beacon 110-2 (S900). A user may execute an application program installed in the mobile terminal 200 (S910), and register a telephone number PN1 of the user in the operation server 300 (S911). That is, the operation server 300 may manage the database 330 for storing the telephone number PN1 of the user (S911).

The operation server 300 may match the UID (BID) of the beacon 110-2 stored in the database 330 and the telephone number PN1 of the user (S913). That is, a UID of a specific beacon and a telephone number of a suitable user for a corresponding beacon may be matched by the operation server 300.

The application program may search for a beacon message BEM output from one or more beacons (S915). The step S915 may or may not be performed according to a setting of the application program or a setting of a user of the mobile terminal 200. When the step S915 is performed by the settings, one of the searched beacon messages may be selected by a user or automatically. For example, the application program may automatically select a beacon message BEM with a relatively high strength.

The application program may receive the beacon message BEM from the beacon 110-2 (S920). The beacon message BEM may include the URL (OS_URL) of the operation server 300 and the UID (BID) of the beacon 110-2 (S920). The application program may access the operation server 300 using the URL (OS_URL) of the operation server 300 and transmit a telephone number PN2 of the mobile terminal 200 and the UID (BID) of the beacon 110-2 to the operation server 300 (S930).

The operation server 300 confirms whether the telephone number PN1 stored in the database 330 and the telephone number PN2 of the mobile terminal 200 match each other (S940), and the application program may use a service provided by the operation server 300 according to a result of the confirmation. In an exemplary embodiment, the application program may use entirely or partly the service provided by the operation server 300 according to the result of the confirmation.

According to an exemplary embodiment, when the telephone number PN1 stored in the database 330 and the telephone number PN2 of the mobile terminal 200 match each other, the operation server 300 may provide a service originally scheduled to be provided by the beacon 110-2, and the application program may use entirely the service provided by the operation server 300.

According to another exemplary embodiment, when the telephone number PN1 stored in the database 330 and the telephone number PN2 of the mobile terminal 200 do not match each other, the operation server 300 may not provide the service originally scheduled to be provided by the beacon 110-2, and the application program may use only a part of the service provided by the operation server 300. That is, the operation server 300 may provide a differentiated service according to a confirmation result of a telephone number.

The application program may receive a service use request transmitted from the operation server 300 (S945), and transmit the user's response to the service use request to the operation server 300 to use entirely or partly the service (S950). The operation server 300 may provide the mobile terminal 200 with a service corresponding to a result of the confirmation when the service use request is received from the application program (S960). Accordingly, the user may use the service using the mobile terminal 200.

Figure 10:
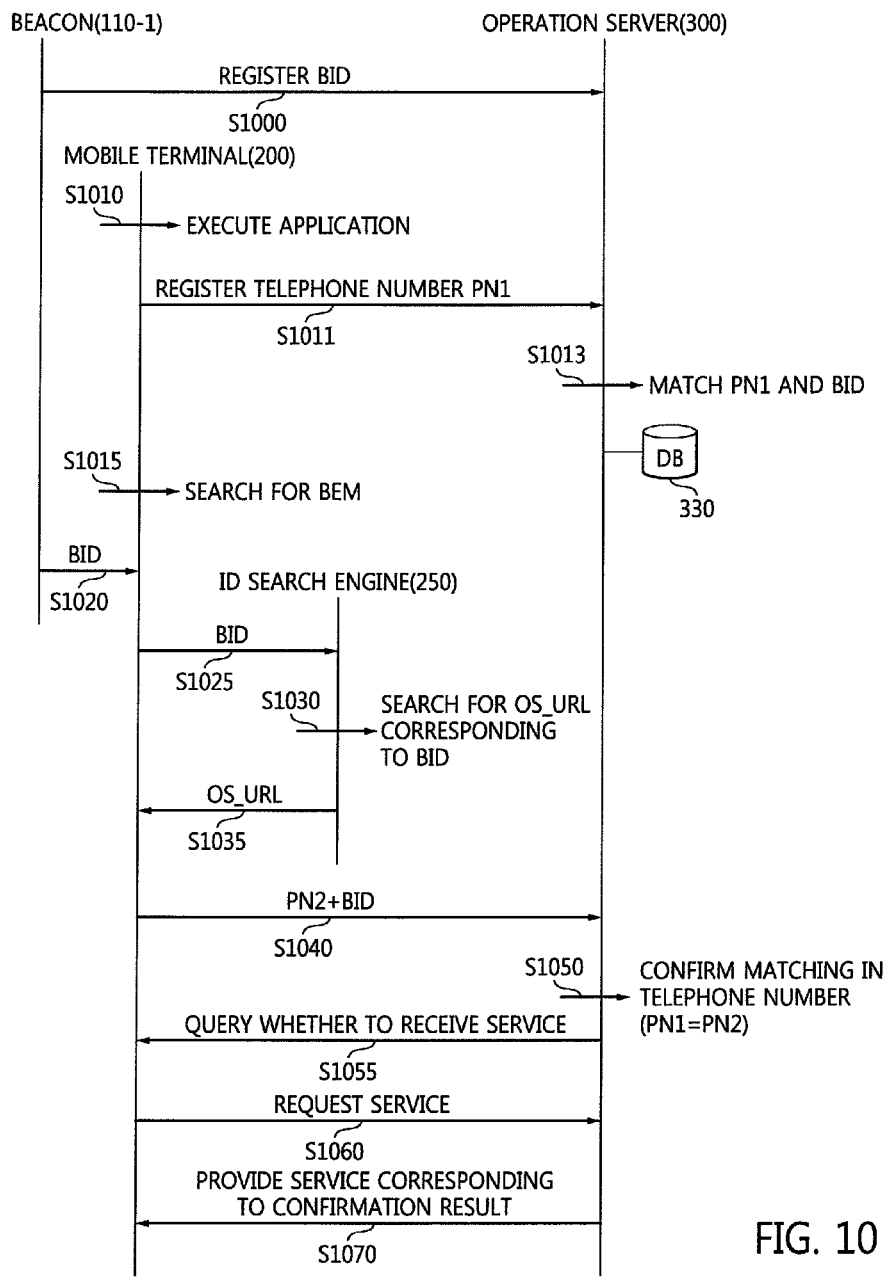
FIG. 10 shows a data flow for describing a user authentication method using a telephone number of a mobile terminal and a beacon according to still another exemplary embodiment of the present inventive concepts.

FIG. 10 shows a data flow for describing a user authentication method using a telephone number of a mobile terminal and a beacon according to still another exemplary embodiment of the present inventive concepts.

Except that an application program installed in the mobile terminal 200 receives a URL (OS_URL) of the operation server 300 corresponding to a UID (BID) of the beacon 110-1 through the ID search engine 250, a method shown in FIG. 10 is substantially the same as or similar to the method shown in FIG. 9.

A UID (BID) of the beacon 110-1 may be registered in the operation server 300 in advance, and the operation server 300 may manage the database 330 for storing the UID (BID) of the beacon 110-1 (S1000).

A user may execute an application program installed in the mobile terminal 200 (S1010), and register a telephone number PN1 of the user in the operation server 300 (S1011). That is, the operation server 300 may manage the database 330 for storing the telephone number PN1 of the user (S1011).

The operation server 300 may match the UID (BID) of the beacon 110-1 stored in the database 330 and the telephone number PN1 of the user (S1013). That is, a UID of a specific beacon and a telephone number of a suitable user for a corresponding beacon may be matched by the operation server 300.

The application program may search for a beacon message BEM output from one or more beacons (S1015). The step S1015 may or may not be performed according to a setting of the application program or a setting of a user of the mobile terminal 200. When the step S1015 is performed by the settings, one of the searched beacon messages may be selected by a user or automatically. For example, the application program may automatically select a beacon message BEM with a relatively high strength.

The application program may receive the beacon message BEM from the beacon 110-1 (S1020). The beacon message BEM may include the UID (BID) of the beacon 110-1 (S1020). The application program may transmit the UID (BID) of the beacon 110-1 to the ID search engine 250 (S1025). The ID search engine 250 may search for a URL (OS_URL) of the operation server 300 corresponding to the UID (BID) of the beacon 110-1 (S1030), and transmit the searched URL (OS_URL) of the operation server 300 to the application program (S1035).

The application program may access the operation server 300 using the URL (OS_URL) of the operation server 300 and transmit a telephone number PN2 of the mobile terminal 200 and the UID (BID) of the beacon 110-1 to the operation server 300 (S1040). The operation server 300 confirms or check whether the telephone number PN1 stored in the database 330 and the telephone number PN2 of the mobile terminal 200 match each other (S1050), and the application program may use a service provided by the operation server 300 according to a result of the confirmation. In an exemplary embodiment, the application program may use entirely or partly the service provided by the operation server 300 according to the result of the confirmation.

According to an exemplary embodiment, when the telephone number PN1 stored in the database 330 and the telephone number PN2 of the mobile terminal 200 match each other, the operation server 300 may provide a service originally scheduled to be provided by the beacon 110-2, and the application program may use entirely the service provided by the operation server 300.

According to another exemplary embodiment, when the telephone number PN1 stored in the database 330 and the telephone number PN2 of the mobile terminal 200 do not match each other, the operation server 300 may not provide the service originally scheduled to be provided by the beacon 110-2, and the application program may use only a part of the service provided by the operation server 300. That is, the operation server 300 may provide a differentiated service according to a confirmation result of a telephone number.

The application program may receive a service use request transmitted from the operation server 300 (S1055), and transmit the user's response to the service use request to the operation server 300 to use entirely or partly the service (S1060). The operation server 300 may provide the mobile terminal 200 with a service corresponding to a result of the confirmation when the service use request is received from the application program (S1070). Accordingly, the user may use the service using the mobile terminal 200.

Figure 11:
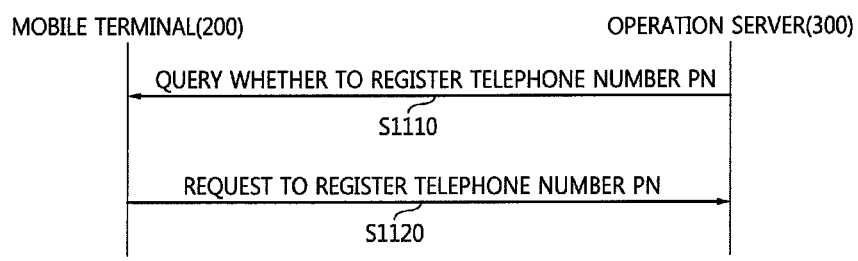
FIG. 11 shows a data flow for describing a step of registering a telephone number of a mobile terminal in an operation server according to an exemplary embodiment of the present inventive concepts.

FIG. 11 shows a data flow for describing a step of registering a telephone number of a mobile terminal in an operation server according to an exemplary embodiment of the present inventive concepts. Steps shown in FIG. 11 may be performed in a case when a new user registers a telephone number in an operation server in the user authentication method shown in FIGS. 2 to 10.

Referring to FIG. 11, the operation server 300 may query an application program installed in the mobile terminal 200 whether to register a telephone number PN of the mobile terminal 200 in the operation server 300 (S1110). In response to the query, the application program may request the operation server 300 to store the telephone number PN of the mobile terminal 200 (S1120).

For example, a method in which the new user joins through the attached NFC device 100 or 100-1 or the installed beacon 110, 110-1 or 110-2 is as follows.

In a process of confirming whether a user is a suitable user for the operation server 300 after the user touches the NFC device 100 or 100-1 or receives a beacon message BEM, when a received telephone number PN2 is different from a telephone number PN1 registered in advance, a query about whether to register a telephone number is put to the user, and when the user wants registration of his or her telephone number, the operation server 300 registers the user's telephone number. According to an exemplary embodiment, authentication may be performed in a one-time password (OTP) transmission method. According to an exemplary embodiment, even with the same NFC device or the same beacon, the operation server 300 may provide different services according to a telephone number PN.

In the user authentication method shown in FIGS. 2 to 10, when a telephone number of an existing user has been changed, the user may get a user authentication through a membership registration procedure to the operation server. As a method for authenticating the user when the user's telephone number is changed, the user may set an ID and a password in the operation server through an additional member registration procedure in preparation for a change in his or her telephone number.

When a message of an unregistered user is displayed on the mobile terminal 200 while using the NFC device 100 or 100-1 or the beacon 110, 110-1, or 110-2 with a changed telephone number, the user may be authenticated using an ID instead of a previous telephone number.

After the user is authenticated by an ID or a password, the user may change the previous telephone number into a new telephone number in the one-time password (OTP) transmission method. After the change, the user may be automatically authenticated using a changed telephone number.

The present inventive concepts are applicable to a system including an operation server, a near field wireless communication device, and a mobile terminal. Moreover, the present inventive concepts are applicable to a method for authenticating a user using the mobile terminal in the system.

What is claimed is:

1. A method for authenticating a user using a mobile terminal in a system including an operation server managing a database for storing a first telephone number of the user, a beacon, and the mobile terminal, the method comprising:
   receiving, by an application program installed in the mobile terminal, a uniform resource locator (URL) of the operation server from the beacon;
   accessing, by the application program, the operation server using the URL and transmitting a second telephone number of the mobile terminal to the operation server;
   using, by the application program, a service provided by the operation server according to a result of comparison between the first telephone number and the second telephone number performed by the operation server;
   receiving, by the application program, a service use request transmitted from the operation server before using the service; and
   transmitting, by the application program, a user's response to the service use request to the operation server to use the service.

2. The method of claim 1,
   wherein the application program uses entirely the service when the first telephone number and the second telephone number match each other, and
   the application program uses only a part of the service when the first telephone number and the second telephone number do not match each other.

3. The method of claim 1, further comprising:
   querying, by the operation server, the application program whether to store the first telephone number in the database; and
   requesting, by the application program, the operation server to store the first telephone number in response to the query.

4. The method of claim 1, further comprising generating, by the application program, an ID and a password by accessing the operation server and changing the first telephone number after authenticating the user using the ID and the password.

5. A method for authenticating a user using a mobile terminal in a system including an operation server managing a database for storing a first telephone number of a user and a first ID of a near field wireless communication device registered in advance, the near field wireless communication device, and the mobile terminal, the method comprising:
   receiving, by an application program installed in the mobile terminal, a second ID of the near field wireless communication device and a uniform resource locator (URL) of the operation server from the near field wireless communication device;
   accessing, by the application program, the operation server using the URL and transmitting the second ID and a second telephone number of the mobile terminal to the operation server;
   using, by the application program, a service provided by the operation server according to a result of comparison in telephone numbers including the first telephone number and the second telephone number and in IDs including the first ID and the second ID performed by the operation server,
   querying, by the operation server, the application program whether to store the first telephone number in the database; and
   requesting, by the application program, the operation server to store the first telephone number in response to the query.

6. The method of claim 5,
   wherein the near field wireless communication device is an NFC device or a beacon.

7. The method of claim 5,
   wherein the application program uses entirely the service when the first telephone number and the second telephone number match each other, and the first ID and the second ID match each other.

8. The method of claim 5,
   wherein the operation server matches the first telephone number and the second telephone number, and
   the application program uses entirely the service when the first telephone number and the second telephone number match each other.

9. A method for authenticating a user using a mobile terminal in a system including an operation server managing a database for storing a first telephone number of a user, a beacon, an ID search engine, and the mobile terminal, the method comprising:
   receiving, by an application program installed in the mobile terminal, a beacon ID from the beacon;
   transmitting, by the application program, the beacon ID to the ID search engine and receiving a uniform resource locator (URL) of an operation server corresponding to the beacon ID from the ID search engine;
   accessing, by the application program, the operation server using the URL and transmitting a second telephone number of the mobile terminal to the operation server;
   using, by the application program, a service provided by the operation server according to a result of comparison between the first telephone number and the second telephone number performed by the operation server;
   receiving, by the application program, a service use request transmitted from the operation server before using the service; and
   transmitting, by the application program, a user's response to the service use request to the operation server to use the service.

10. The method of claim 9,
    wherein the application program uses entirely the service when the first telephone number and the second telephone number match each other, and
    the application program uses only a part of the service when the first telephone number and the second telephone number do not match each other.

11. A method for authenticating a user using a mobile terminal in a system including an operation server managing a database for storing a first telephone number of a user and a first ID of a beacon registered in advance, the beacon, an ID search engine, and the mobile terminal, the method comprising:
  receiving, by an application program installed in the mobile terminal, a second ID of the beacon from the beacon;
  transmitting, by the application program, the second ID of the beacon to the ID search engine and receiving a uniform resource locator (URL) of an operation server corresponding to the second ID from the ID search engine;
  accessing, by the application program, the operation server using the URL and transmitting the second ID and a second telephone number of the mobile terminal to the operation server;
  using, by the application program, a service provided by the operation server according to a result of comparison in telephone numbers including the first telephone number and the second telephone number and in IDs including the first ID and the second ID performed by the operation server receiving, by the application program, a service use request transmitted from the operation server before using the service; and
  transmitting, by the application program, a user's response to the service use request to the operation server to use the service.

12. The method of claim 11, wherein the application program uses entirely the service when the first telephone number and the second telephone number match each other, and the first ID and the second ID match each other.

13. The method of claim 11, wherein the operation server matches the first telephone number and the first ID, and the application program uses entirely the service when the first telephone number and the second telephone number match each other.

* * * * *